(12) United States Patent
Sun et al.

(10) Patent No.: US 10,976,146 B2
(45) Date of Patent: Apr. 13, 2021

(54) SYSTEM FOR SHAPE ERROR IN-SITU MEASUREMENT OF LARGE-SCALE TORUS

(71) Applicant: Dalian University of Technology, Dalian (CN)

(72) Inventors: Qingchao Sun, Dalian (CN); Jue Wang, Dalian (CN); Xin Liu, Dalian (CN); Wei Sun, Dalian (CN); Yingjie Jiang, Dalian (CN); Jiaqi Suo, Dalian (CN)

(73) Assignee: Dalian University of Technology, Liaoning (CN)

( * ) Notice: Subject to any disclaimer, the term of this patent is extended or adjusted under 35 U.S.C. 154(b) by 292 days.

(21) Appl. No.: 16/321,315

(22) PCT Filed: May 3, 2017

(86) PCT No.: PCT/CN2017/082889
§ 371 (c)(1),
(2) Date: Jan. 28, 2019

(87) PCT Pub. No.: WO2018/201337
PCT Pub. Date: Nov. 8, 2018

(65) Prior Publication Data
US 2019/0170492 A1 Jun. 6, 2019

(51) Int. Cl.
*G01B 5/20* (2006.01)
*G01B 5/00* (2006.01)
*G01B 5/28* (2006.01)

(52) U.S. Cl.
CPC .............. *G01B 5/20* (2013.01); *G01B 5/0004* (2013.01); *G01B 5/285* (2013.01)

(58) Field of Classification Search
CPC .......... G01B 5/20; G01B 5/285; G01B 7/345; G01B 21/30

(Continued)

(56) References Cited

U.S. PATENT DOCUMENTS

2005/0278968 A1* 12/2005 Takahashi ................ G01B 5/20
33/551
2012/0047756 A1* 3/2012 Ferrari .................... G01B 5/012
33/503

(Continued)

FOREIGN PATENT DOCUMENTS

| CN | 103697800 A | 4/2014 |
| CN | 105021141 A | 11/2014 |

(Continued)

*Primary Examiner* — Christopher W Fulton
(74) *Attorney, Agent, or Firm* — Muncy, Geissler, Olds & Lowe, P.C.

(57) ABSTRACT

Disclosed is a system for shape error in-situ measurement of large-scale torus, which comprises an attitude adjusting part, a rotating part and a measuring part. The attitude adjusting part comprises an attitude adjusting platform, an attitude adjusting platform motor and an adapter panel, wherein the attitude adjusting platform can adjust the rotation angles along z-axis and x-axis, the angle adjusted is controlled by the attitude adjusting platform motor, and the attitude adjusting part is connected with the rotating part through the adapter panel; the rotating part comprises a rotating index plate base and a high-precision rotating index plate which is released from fixation by a lever for rotating, rotated manually for a required angle, and then fixed again by restoring the lever; the measuring part comprises a sensor clamp, sensor holders, contact sensors and associated equipment, wherein the sensor clamp is positioned with the rotating index plate by a mandrel and then fixed by two bolts and nuts; and the sensor clamp has four groups of sensor jacks in total, with at least three jacks in each group, and a sensor holder is installed in each sensor jack and used for fixing each sensor.

1 Claim, 2 Drawing Sheets

(58) Field of Classification Search
USPC ........................................ 33/503, 533, 1 BB
See application file for complete search history.

(56) References Cited

U.S. PATENT DOCUMENTS

| | | | | |
|---|---|---|---|---|
| 2013/0036619 A1* | 2/2013 | Ruck | ................... | G05B 19/401 |
| | | | | 33/503 |
| 2015/0168121 A1* | 6/2015 | Tait | ........................ | G01B 5/008 |
| | | | | 33/503 |
| 2019/0178642 A1* | 6/2019 | Sun | ....................... | G01B 5/0004 |
| 2020/0200519 A1* | 6/2020 | Leber | ....................... | G01B 5/20 |

FOREIGN PATENT DOCUMENTS

| | | | |
|---|---|---|---|
| CN | 104515481 | A | 4/2015 |
| CN | 106091874 | A | 11/2016 |
| CN | 107063160 | A | 8/2017 |
| CN | 107152922 | A | 9/2017 |
| JP | 2004151102 | A | 8/2017 |

\* cited by examiner

SYSTEM FOR SHAPE ERROR IN-SITU MEASUREMENT OF LARGE-SCALE TORUS

TECHNICAL FIELD

The present invention belongs to the technical fields of in-situ testing technology, measuring platform attitude adjustment, high-precision rotating platform, mechanical clamp design, contact sensor, data acquisition and analysis based on Labview, etc., and particularly relates to a system for shape error in-situ measurement of torus.

BACKGROUND

The present invention is mainly applied to the shape error in-situ measurement of large-scale toruses and flanges in mechanical parts.

The shape error information of assembly interface is very important in the equipment of mechanical parts, and shape error often affects the contact stiffness and assembly precision. The contact stiffness often directly affects the overall dynamic characteristics and airtightness of the equipment. In order to control the assembly performance accurately, it is necessary to test the shape error of the parts. For example, during the assembly of major equipment such as aircraft engine and centrifugal compressor, shape error in-situ measurement is the prerequisite and foundation for implementing the assembly process and accurately controlling the performance, and is also an indispensable link during intelligent assembly. In addition, annular parts/assemblies are widely used during the assembly of major equipment such as aircraft engine and centrifugal compressor, and these annular parts/assemblies are usually complex in structure and heavy in weight, and can only be measured by in-situ measurement technology.

At present, the widely used method in factory is to measure the full indicator movement; however, the full indicator movement error is a comprehensive reflection of position error and shape error, and it is still difficult to obtain the shape error according to the full indicator movement information. Flatness instrument or three-coordinate measuring instrument can measure the specific morphology of the assembly interface of the parts, but is usually not applicable to measuring the shape error of interface of large-scale annular parts such as aircraft engine, gas turbine and centrifugal compressor rotor.

SUMMARY

The aim of the present invention is to design a device for shape error in-situ measurement of large-scale toruses and flanges.

The technical solution of the present invention is as follows:

A system for shape error in-situ measurement of large-scale torus comprises an attitude adjusting part, a rotating part and a measuring part.

The attitude adjusting part comprises an attitude adjusting platform 5, an attitude adjusting platform motor 4 and an adapter panel 6; the attitude adjusting platform 5 is used for adjusting the rotation angles along z-axis and x-axis and is controlled by the attitude adjusting platform motor 4, and the attitude adjusting platform motor 4 is controlled by a controller; z-axis is the axis perpendicular to the plane of the attitude adjusting platform 5, and the angle adjusted is from 0° to 360°; x-axis is the axis perpendicular to the axis of the attitude adjusting platform motor 4, and the angle adjusted is from −30° to 30°; and the bottom surface of the adapter panel 6 is connected to the top surface of the attitude adjusting platform 5, and the top surface of the adapter panel 6 is connected to a rotating index plate base 7.

The rotating part comprises the rotating index plate base 7 and a rotating index plate 1; the main body of the rotating index plate base 7 is of a cubic frame structure with T-grooves in two side surfaces and bottom surface, and the T-grooves are connected with the adapter panel 6 by mating bolts and nuts; a gear on the rotating index plate 1 is engaged with a gear on the rotating index plate base 7; the top surface of the rotating index plate base 7 is provided with a lever, and the rotating index plate 1 can be driven to move forward by moving the lever forward to make the gear on the rotating index plate 1 engage with the gear on the rotating index plate base 7, can be rotated manually for a required angle, and then stuck and fixed again by restoring the lever to make the gear on the rotating index plate 1 disengage with the gear on the rotating index plate base 7.

The minimum rotation angle of the rotating index plate 1 is 1°, the rotation precision is 10″, and the top surface of the rotating index plate 1 has a T-groove and a central hole; one side of the rotating index plate 1 is positioned with a mandrel of a sensor clamp 10 through the central hole and fixed by the T-groove and mating bolt and nut 2, and the other side is engaged with the gear on the rotating index plate base 7 through a gear.

The measuring part comprises the sensor clamp 10, sensor holders 9, contact sensors 8; the sensor clamp 10 is of a disk structure and has four groups of sensor jacks in total, two groups are single-row sensor jacks with three jacks in each group, and the other two groups are double-row sensor jacks with three jacks in each row and six jacks in each group; the position of the central jack in each row of sensor jacks is set to 0°, 90°, 180° and 270° respectively, and the angle between the central jack and the sensor jacks on both sides of the central jack is 10°; in each row, all the sensor jacks have equal distances to the disk center, but different rows have different distances to the disk center, and the distances from the sensor jacks to the disk center of the sensor clamp 10 is from 100 mm to 300 mm; the single-row sensor jacks are used for measuring the shape error of a flange surface on the centerline of the jacks, and the double-row sensor jacks are used for measuring the shape error on two axial sides of the jacks; a sensor holder 9 is installed in each sensor jack and used for fixing each contact sensor 8; and data measured by the contact sensors 8 is transmitted to the upper computer through an RS232 bus, and a Labview program is written in the upper computer to read and analyze the data.

The present invention has the following beneficial effects: the system for shape error in-situ measurement of large-scale torus provided by the present invention can actively adjust the parallelism between the measuring head plane and the measured surface to further reduce the error, and therefore the reliability of shape error in-situ evaluation of large-scale torus is greatly improved.

In the figures: 1 rotating index plate; 2 bolt and nut; 3 T-shaped bolt and nut; 4 attitude adjusting platform motor;

5 attitude adjusting platform; 6 adapter panel; 7 rotating index plate base; 8 contact sensor; 9 sensor holder; 10 sensor clamp; and 11 lever.

DETAILED DESCRIPTION

Specific embodiment of the present invention is described below in detail in combination with the technical solution and accompanying drawings.

Figure 1:
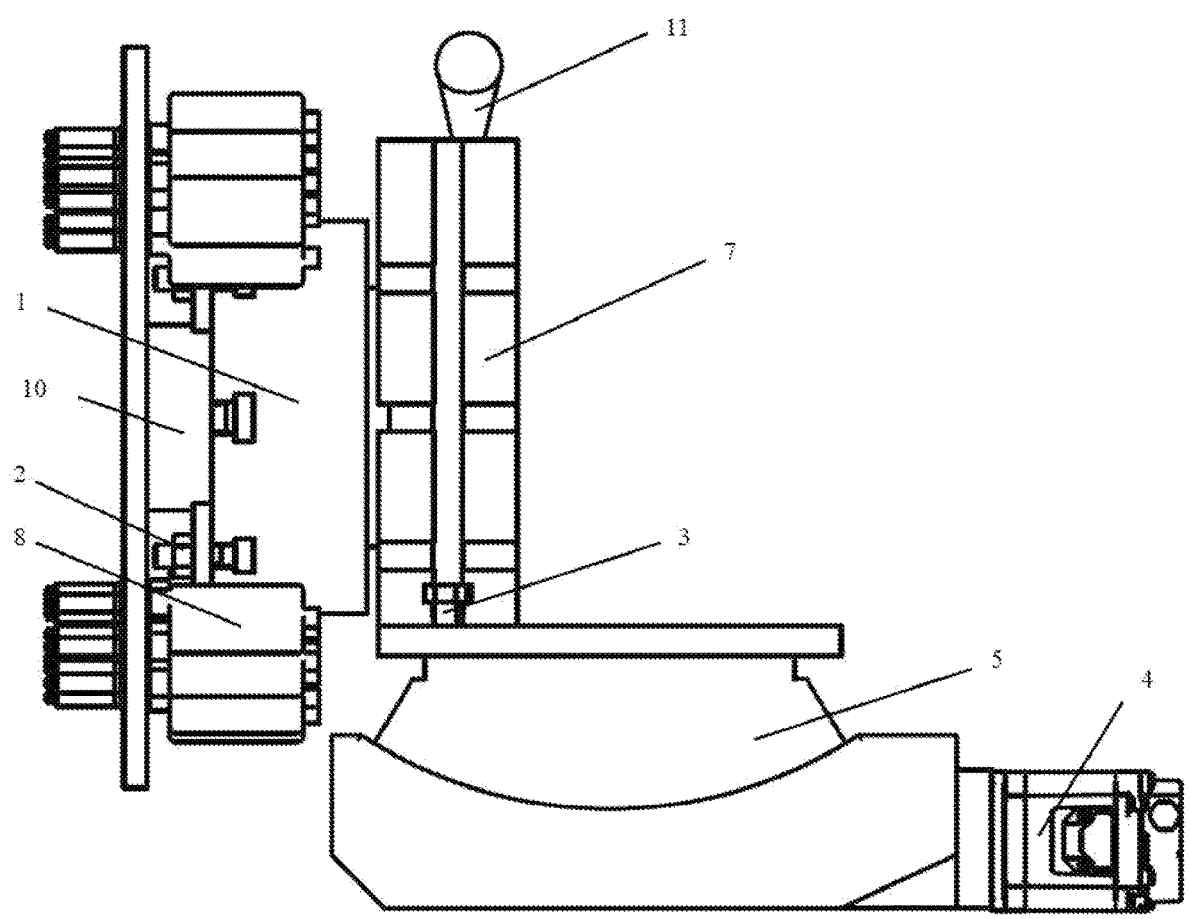
FIG. 1 is a front view of the embodiment of the present invention.
Figure 2:
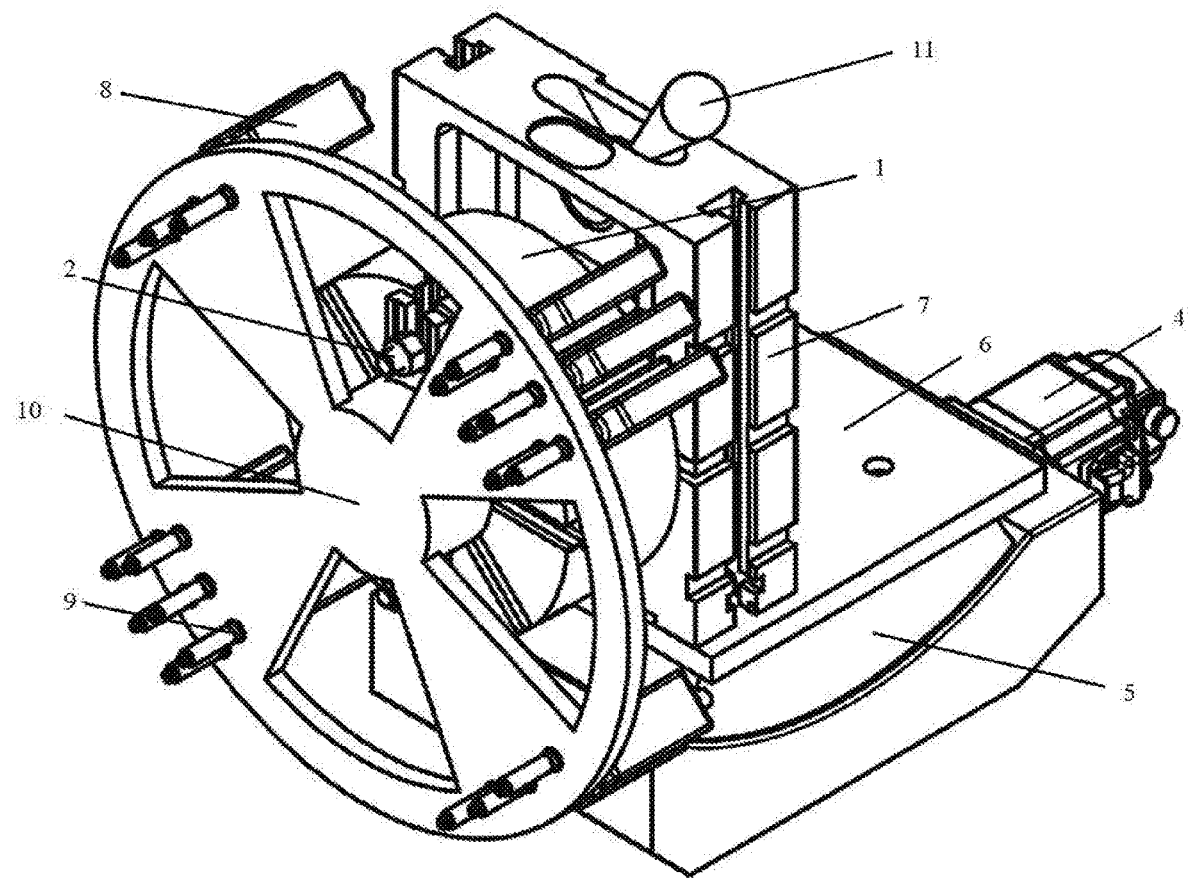
FIG. 2 is a three-dimensional structure diagram of the embodiment of the present invention.

The simplified structure diagrams of FIG. 1 and FIG. 2 mainly comprise: 1 rotating index plate; 2 bolt and nut; 3 T-shaped bolt and nut; 4 attitude adjusting platform motor; 5 attitude adjusting platform; 6 adapter panel; 7 rotating index plate base; 8 contact sensor; 9 sensor holder; 10 sensor clamp; and 11 lever.

The attitude adjusting platform 5 is used for adjusting the rotation angles along z-axis and x-axis and is controlled by the attitude adjusting platform motor 4, and the attitude adjusting platform motor 4 is controlled by a controller; z-axis is the axis perpendicular to the plane of the attitude adjusting platform 5, and the angle adjusted is from 0° to 360°; x-axis is the axis perpendicular to the axis of the attitude adjusting platform motor 4, and the angle adjusted is from −30° to 30°; the bottom surface of the adapter panel 6 is connected to the top surface of the attitude adjusting platform 5, and the top surface of the adapter panel 6 is connected to a rotating index plate base 7.

The main body of the rotating index plate base 7 is of a cubic frame structure with T-grooves in two side surfaces and bottom surface, and the T-grooves are connected with the adapter panel 6; the rotating index plate 1 is engaged with a gear on the rotating index plate base 7; the top surface is provided with a lever, and the rotating index plate 1 can be engaged with the gear on the rotating index plate base 7 by moving the lever forward, can be rotated manually for a required angle, and then stuck and fixed again by restoring the lever to make the rotating index plate 1 disengage with the gear on the rotating index plate base 7; The minimum rotation angle of the rotating index plate 1 is 1°, the rotation precision is 10", and the top surface of the rotating index plate 1 has a T-groove and a central hole; one side of the rotating index plate 1 is positioned with a mandrel of a sensor clamp 10 through the central hole and fixed by the T-groove and mating bolt and nut 2, and the other side is engaged with the gear on the rotating index plate base 7 through a gear.

The sensor clamp 10 has four groups of sensor jacks in total, two groups have three jacks in each group, and the other two groups are double-row sensor jacks with three jacks in each row and six jacks in each group. The position of the central jack in each group of sensor jacks is set to 0°, 90°, 180° and 270° respectively, and the angle between the central jack and the sensor jacks on both sides of the central jack is 10°. In each group, all the sensor jacks have equal distances to the disk center, but different groups have different distances to the disk center, and the distances from the sensor jacks to the disk center is from 100 mm to 300 mm; the single-row sensor jacks are used for measuring the shape error of a flange surface on the centerline of the jacks, and the double-row sensor jacks are used for measuring the shape error on two axial sides of the jacks; and a sensor holder 9 is installed in each sensor jack and used for fixing each contact sensor 8.

We claims:

1. A system for flatness on-line measurement of torus, characterized in that: the system for flatness on-line measurement of torus comprises an attitude adjusting part, a rotating part and a measuring part;

the attitude adjusting part comprises an attitude adjusting platform (5), an attitude adjusting platform motor (4) and an adapter panel (6); the attitude adjusting platform (5) is used for adjusting the rotation angles along z-axis and x-axis and is controlled by the attitude adjusting platform motor (4), and the attitude adjusting platform motor (4) is controlled by a controller; z-axis is the axis perpendicular to the plane of the attitude adjusting platform (5), and the angle adjusted is from 0° to 360°; x-axis is the axis perpendicular to the axis of the attitude adjusting platform motor (4), and the angle adjusted is from −30° to 30°; the bottom surface of the adapter panel (6) is connected to the top surface of the attitude adjusting platform (5), and the top surface of the adapter panel (6) is connected to a rotating index plate base (7);

the rotating part comprises the rotating index plate base (7) and a rotating index plate (1); the main body of the rotating index plate base (7) is of a cubic frame structure with T-grooves in two side surfaces and bottom surface, and the T-grooves are connected with the adapter panel (6) by mating bolts and nuts; a gear on the rotating index plate (1) is engaged with a gear on the rotating index plate base (7); the top surface of the rotating index plate base (7) is provided with a lever, and the rotating index plate (1) can be driven to move forward by moving the lever forward to make the gear on the rotating index plate (1) engage with the gear on the rotating index plate base (7), can be rotated manually for a required angle, and then stuck and fixed again by restoring the lever to make the gear on the rotating index plate (1) disengage with the gear on the rotating index plate base (7);

the minimum rotation angle of the rotating index plate (1) is 1°, the rotation precision is 10", and the top surface of the rotating index plate (1) has a T-groove and a central hole; one side of the rotating index plate (1) is positioned with a mandrel of a sensor clamp (10) through the central hole and fixed by the T-groove and mating bolt and nut (2), and the other side is engaged with the gear on the rotating index plate base (7) through a gear;

the measuring part comprises the sensor clamp (10), sensor holders (9), contact sensors (8); the sensor clamp (10) is of a disk structure and has four groups of sensor jacks in total, two groups are single-row sensor jacks with three jacks in each group, and the other two groups are double-row sensor jacks with three jacks in each row and six jacks in each group; the position of the central jack in each row of sensor jacks is set to 0°, 90°, 180° and 270° respectively, and the angle between the central jack and the sensor jacks on both sides of the central jack is 10°; in each row, all the sensor jacks have equal distances to the disk center, but different rows have different distances to the disk center, and the distances from the sensor jacks to the disk center of the sensor clamp (10) is from 100 mm to 300 mm; the single-row sensor jacks are used for measuring the flatness of a flange surface on the centerline of the jacks, and the double-row sensor jacks are used for measuring the flatness on two axial sides of the jacks; a sensor holder (9) is installed in each sensor jack and used for fixing each contact sensor (8); and data measured by the contact sensors (8) is transmitted to the upper computer through an RS232 bus, and a Labview program is written in the upper computer to read and analyze the data.

* * * * *